(12) United States Patent
Lee

(10) Patent No.: US 9,451,238 B2
(45) Date of Patent: Sep. 20, 2016

(54) STEREO CAMERA APPARATUS FOR A MOBILE DEVICE, AND IMAGING METHOD THEREFOR

(75) Inventor: Youn-Woo Lee, Anyang-si (KR)

(73) Assignee: STEREOPIA CO., LTD., Seoul (KR)

( * ) Notice: Subject to any disclaimer, the term of this patent is extended or adjusted under 35 U.S.C. 154(b) by 442 days.

(21) Appl. No.: 13/985,939

(22) PCT Filed: Feb. 15, 2012

(86) PCT No.: PCT/KR2012/001127
§ 371 (c)(1),
(2), (4) Date: Nov. 19, 2013

(87) PCT Pub. No.: WO2012/111970
PCT Pub. Date: Aug. 23, 2012

(65) Prior Publication Data
US 2014/0085423 A1    Mar. 27, 2014

(30) Foreign Application Priority Data
Feb. 16, 2011  (KR) ................. 10-2011-0013507

(51) Int. Cl.
*H04N 7/00* (2011.01)
*H04N 7/12* (2006.01)
*H04N 13/02* (2006.01)

(52) U.S. Cl.
CPC ...... *H04N 13/0203* (2013.01); *H04N 13/0239* (2013.01); *H04N 13/0296* (2013.01)

(58) Field of Classification Search
None
See application file for complete search history.

(56) References Cited

U.S. PATENT DOCUMENTS

2010/0231691 A1* 9/2010 Lee ................... H04N 5/23212
348/47
2011/0117958 A1* 5/2011 Kim ...................... G03B 35/10
455/556.1
(Continued)

FOREIGN PATENT DOCUMENTS

KR    2005-0083352 A    8/2005
KR    2007-0030501 A    3/2007
KR    2009-0035880 A    4/2009

OTHER PUBLICATIONS

International Search Report PCT/ISA/210 for PCT/KR2012/001127 dated Sep. 21, 2012.
(Continued)

*Primary Examiner* — Frederick Bailey
*Assistant Examiner* — Talha M Nawaz
(74) *Attorney, Agent, or Firm* — Harness, Dickey & Pierce, P.L.C.

(57) ABSTRACT

A method of shooting an OSMU stereoscopic image using a mobile stereoscopic camera is provided. The method includes an operation of placing the mobile stereoscopic camera on a predetermined location of a mobile shooting place, an operation of determining a focusing distance in a wide-angle shooting condition when a far point of the mobile stereoscopic camera is infinity, an operation of calculating a distance between two cameras of the mobile stereoscopic camera by setting the far point of the mobile stereoscopic camera to be infinity at a location of the mobile stereoscopic camera, an operation of adjusting the distance between the cameras of the mobile stereoscopic camera to be the calculated distance between the cameras of the mobile stereoscopic camera, and an operation of shooting the OSMU stereoscopic image using the mobile stereoscopic camera of which the distance between the cameras is adjusted.

3 Claims, 4 Drawing Sheets

(56) References Cited

U.S. PATENT DOCUMENTS

2012/0007953 A1* 1/2012 Sung ............... H04N 13/0018
 348/46
2012/0195583 A1* 8/2012 Pace .................... G03B 35/08
 396/326

OTHER PUBLICATIONS

Written Opinion PCT/ISA/237 for dated for PCT/KR2012/001127 dated Sep. 21, 2012.

* cited by examiner

STEREO CAMERA APPARATUS FOR A MOBILE DEVICE, AND IMAGING METHOD THEREFOR

This application is the national phase under 35 U.S.C. §371 of PCT International Application No. PCT/KR2012/001127 which has an International filing date of Feb. 15, 2012, which designated the Republic of Korea and which claims priority to Korean patent application number KR 10-2011-0013507 filed Feb. 16, 2011; the entire contents of each of which are hereby encorporated by reference.

BACKGROUND

1. Technical Field

Example embodiments relate generally to a mobile stereoscopic camera. More particularly, embodiments of the inventive concept relate to a mobile stereoscopic camera capable of making a stereoscopic video mobile content that can be viewed without any eye-fatigue on 3D (i.e., three-dimensional) displays of various sizes such as a display of a mobile terminal (e.g., a cellular phone), a display of a personal computer, a display of a television, a large movie screen, etc.

In addition, this applicant filed a Korean Patent Application No. 10-2007-0100904 titled "OSMU (ONE SOURCE MULTI USE)-TYPE STEREOSCOPIC CAMERA AND METHOD OF MAKING STEREOSCOPIC VIDEO CONTENT THEREOF".

2. Description of the Related Art

Recently, displays of various sizes are used due to developments of electronic and semiconductor technologies. Thus, a viewer (i.e., a user) watches an image on displays of various sizes such as a display having a size between 2" and 2.5" of a cellular phone, a display having a size between 4" and 9" of a personal multimedia player (PMP), a display of digital multimedia broadcasting (DMB) receiver, a display of a navigation system, a display having a size between 9" and 19" of a laptop, a display having a size between 12" and 24" of a personal computer, a display having a size between 15" and 60" of a television, a projection display having a size between 30" and 200", a large movie screen having a size between 100" and 300", etc.

However, conventional stereoscopic images are made to be applied to a large movie screen having a size between 100" and 300". For this reason, the conventional stereoscopic images may not provide a stereoscopic effect when being displayed on a display of a cellular phone having a size of 2", and may result in a headache and/or a eye-fatigue (i.e., a viewer cannot watch the conventional stereoscopic images for a long time) when being displayed on a display of a personal computer having a size of tens of inches or a display of a television having a size of tens of inches.

Generally, a distance between both eyes of a human being is about 65 mm. Thus, it has been considered that a distance between two cameras for shooting a stereoscopic image is required to be fixed to the distance between both eyes of the human being.

However, when a viewer watches the stereoscopic image, a distance between the viewer and a display (i.e., screen) may vary from about 25 cm (i.e., a distance for a mobile device) to about 12m (i.e., a distance for a theater). That is, an angle of view may vary according to viewing conditions (i.e., viewing environments).

Recently, a so-called netizen-culture (e.g., a user makes a video using his own mobile device, uploads and downloads the video on the internet, and enjoys the video using a personal computer, a television, etc) is widely spread in the world. In addition, the user may send and receive the video with other users in real-time using a video communicating service (e.g., 3G video communicating service, etc).

Generally, unlike a movie shooting environment, a user mainly shoots an image of his own face (i.e., referred to as self-camera images), or mainly shoots an image of a phone-call sender's face and/or a phone-call caller's face with a mobile device (e.g., smart-phone, etc) during a mobile video calling in a mobile shooting environment. Thus, a stereoscopic camera that is suitable for the mobile shooting environment is required to shoot a stereoscopic image. However, a technology related to the stereoscopic camera is in a beginning stage until now.

As described above, the mobile shooting environment is different from the movie shooting environment in which a stereoscopic image is displayed on displays (e.g., television, large movie screen, etc) having different sizes from a size of the display of the mobile device. For this reason, even when a stereoscopic image is shot by controlling a distance between two stereo cameras to be equal to a distance between both eyes of a human being, the stereoscopic image may not satisfy all stereoscopic display environments (i.e., mobile device, television, large movie screen, etc).

Therefore, it is difficult for conventional mobile stereoscopic shooting method to make one source multi use-(OSMU)-type content which is suitable for a small-size display of 2" to a large movie screen for a theater until now.

SUMMARY

Some example embodiments provide a mobile stereoscopic camera capable of shooting an OSMU-type mobile stereoscopic image as well as providing an optimal stereoscopic effect that is adapted to a mobile shooting environment.

Some example embodiments provide a method of shooting an OSMU-type mobile stereoscopic image using an OSMU-type mobile stereoscopic camera capable of providing an optimal stereoscopic effect that is adapted to a mobile shooting environment.

According to some example embodiments, a method of shooting a one source multi use (OSMU) stereoscopic image using a mobile stereoscopic camera is provided. The method may include an operation of placing the mobile stereoscopic camera on a predetermined location of a mobile shooting place, an operation of determining a focusing distance in a wide-angle shooting condition when a far point of the mobile stereoscopic camera is infinity, an operation of calculating a distance between two cameras of the mobile stereoscopic camera by setting the far point of the mobile stereoscopic camera to be infinity at a location of the mobile stereoscopic camera, an operation of adjusting the distance between the cameras of the mobile stereoscopic camera to be the calculated distance between the cameras of the mobile stereoscopic camera, and an operation of shooting the OSMU stereoscopic image using the mobile stereoscopic camera of which the distance between the cameras is adjusted.

In example embodiments, the focusing distance may be determined based on an equation having a horizontal width of an image sensor, a focal distance, and a horizontal face-width.

In example embodiments, a zooming operation may be performed on focal distances that are greater than the focal distance of the mobile stereoscopic camera in the wide-angle shooting condition.

In example embodiments, the distance between the cameras of the mobile stereoscopic camera may be readjusted based on respective zoomed focal distances.

According to some example embodiments, a mobile stereoscopic camera may include left and right cameras aligned with parallel optical axes, a distance calculating unit configured to calculate a focusing distance of the left and right cameras, a camera distance calculating unit configured to calculate a distance between the left and right cameras based on information related to the calculated focusing distance, infinity, a critical parallax, and focused focal distance, a camera distance adjusting module configured to adjust the distance between the left and right cameras in response to the calculated distance between the left and right cameras, and an image storing unit configured to store left and right images photographed by the left and right cameras, the distance of the left and right cameras being readjusted by the camera distance calculating unit.

Therefore, the present inventive concept may easily make an OSMU-type stereoscopic mobile content by providing a mobile stereoscopic camera that is suitable for a mobile shooting environment.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
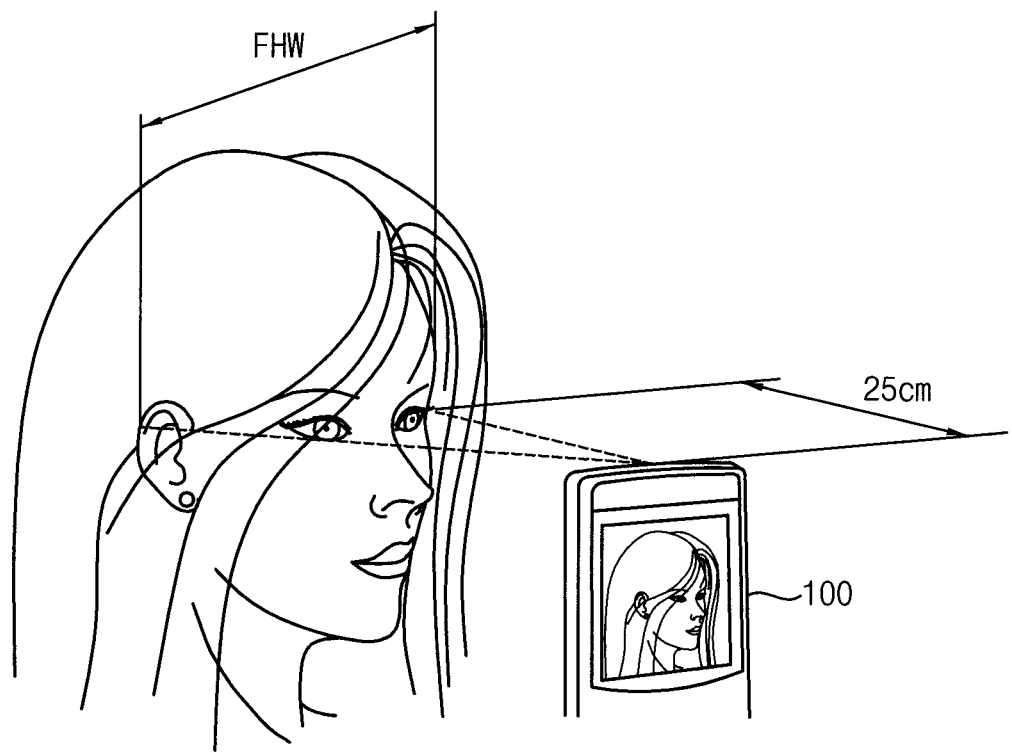
FIG. 1 is a diagram illustrating a mobile shooting environment in which a mobile stereoscopic camera is installed.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a mobile shooting environment in which a mobile stereoscopic camera is installed.

Referring to FIG. 1, a cellular phone 100 having a mobile stereoscopic camera according to example embodiments may mainly shoots a facial picture. For example, a distance ZO between a focusing point (also, referred to as a convergence point) OZ and a lens of the mobile stereoscopic camera of the cellular phone 100 may be about 25 cm. That is, in the mobile shooting environment, it is enough that a user senses a depth effect of a stereoscopic image to provide a stereoscopic effect. This is because the mobile shooting environment does not need a highly stable image (e.g., a user may shoot the stereoscopic image when the user moves). Thus, a far point of the mobile stereoscopic camera is fixed to infinity, so that an overall stable stereoscopic effect may be implemented.

A stereoscopic shooting condition according to a size of an image sensor of the cellular phone 100 is shown in [Table 1] below.

TABLE 1

|  | ⅐" (CIF) | ⅙" (NTSC) | ⅕" (VGA) | ¼.5" (1.6M) | ¼" (1.3M) | ⅓" (2M) | ½.5" (5M) | ½.3" (3.2M) | ½" (3.2M) | ⅔" (3.2M) |
|---|---|---|---|---|---|---|---|---|---|---|
| Diameter | 2.50 | 2.94 | 3.44 | 4.04 | 4.00 | 6.00 | 7.13 | 8.00 | 8.00 | 11.00 |
| Width | 1.91 | 2.36 | 2.76 | 3.24 | 3.20 | 4.80 | 5.700 | 6.40 | 6.40 | 9.59 |
| Height | 1.61 | 1.76 | 2.05 | 2.41 | 2.40 | 3.60 | 4.276 | 4.80 | 4.80 | 5.39 |

TABLE 1-continued

| | | 1/7" (CIF) | 1/6" (NTSC) | 1/5" (VGA) | 1/4.5" (1.6M) | 1/4" (1.3M) | 1/3" (2M) | 1/2.5" (5M) | 1/2.3" (3.2M) | 1/2" (3.2M) | 2/3" (3.2M) |
|---|---|---|---|---|---|---|---|---|---|---|---|
| | Resolution | 352 × 288 | 306 × 240 | 664 × 492 | 1472 × 1096 | 1300 × 1028 | 1600 × 1200 | 2592 × 1944 | 2048 × 1536 | 2048 × 1536 | 2048 × 1536 |
| Child's Face-width 200 mm | | | | | | | | | | | |
| 25 cm | Diameter | | | | | 67.38 | | | | | |
| | Width | | | | | 56.14 | 56.14 | | | | |
| | Height | 43.60 | 43.60 | 43.60 | 43.60 | 43.60 | 43.60 | 43.60 | 43.60 | 43.60 | 43.60 |
| | Focal Distance | 2.01 | 2.20 | 2.56 | 3.01 | 3.00 | 4.50 | 5.35 | 6.00 | 6.00 | 6.74 |
| 20 cm | Diameter | | | | | 79.61 | | | | | |
| | Width | | | | | 67.38 | 67.38 | | | | |
| | Height | 53.13 | 53.13 | 53.13 | 53.13 | 53.13 | 53.13 | 53.13 | 53.13 | 53.13 | 53.13 |
| | Focal Distance | 1.61 | 1.76 | 2.05 | 2.41 | 2.40 | 3.60 | 4.28 | 4.80 | 4.80 | 5.39 |
| 30 cm | Diameter | | | | | 58.11 | | | | | |
| | Width | | | | | 47.92 | 47.92 | | | | |
| | Height | 36.87 | 36.87 | 36.87 | 36.87 | 36.87 | 36.87 | 36.87 | 36.87 | 36.87 | 36.87 |
| | Focal Distance | 2.42 | 2.64 | 3.08 | 3.62 | 3.60 | 5.40 | 6.41 | 7.20 | 7.20 | 8.09 |
| Adult's Face-width 230 mm | | | | | | | | | | | |
| 30 cm | Diameter | | | | | 65.15 | | | | | |
| | Width | | | | | 54.14 | 65.15 | | | | |
| | Height | 41.95 | 41.95 | 41.95 | 41.95 | 41.95 | 41.95 | 41.95 | 41.95 | 41.95 | 41.95 |
| | Focal Distance | 2.10 | 2.30 | 2.67 | 3.14 | 3.13 | 4.70 | 5.58 | 6.26 | 6.26 | 7.03 |
| 25 cm | Diameter | | | | | 74.95 | | | | | |
| | Width | | | | | 63.04 | 63.04 | | | | |
| | Height | 49.40 | 49.40 | 49.40 | 49.40 | 49.40 | 49.40 | 49.40 | 49.40 | 49.40 | 49.40 |
| | Focal Distance | 1.75 | 1.91 | 2.23 | 2.62 | 2.61 | 3.91 | 4.65 | 5.22 | 5.22 | 5.86 |
| 35 cm | Diameter | | | | | 57.41 | | | | | |
| | Width | | | | | 47.32 | 47.32 | | | | |
| | Height | 36.38 | 36.38 | 36.38 | 36.38 | 36.38 | 36.38 | 36.38 | 36.38 | 36.38 | 36.38 |
| | Focal Distance | 2.45 | 2.68 | 3.12 | 3.67 | 3.65 | 5.48 | 6.51 | 7.30 | 7.30 | 8.20 |

A critical parallax in infinity according to a focal distance is shown in [Table 2] below.

TABLE 2

| fl(mm) | Infinity |
|---|---|
| 5 | 0.01677 |
| 6 | 0.01392 |
| 7 | 0.01188 |
| 8 | 0.01036 |
| 9 | 0.00917 |
| 10 | 0.00822 |
| 11 | 0.00744 |
| 12 | 0.00679 |
| 15 | 0.00537 |
| 20 | 0.00394 |
| 25 | 0.00309 |
| 30 | 0.00252 |
| 35 | 0.00211 |
| 40 | 0.00181 |
| 45 | 0.00157 |
| 50 | 0.00138 |
| 60 | 0.00109 |
| 70 | 0.00089 |
| 80 | 0.00074 |
| 90 | 0.00062 |
| 100 | 0.00052 |

A focal distance according to a size of an image sensor, a width of an object, and a distance between an object and a mobile stereoscopic camera is shown in [Table 1]. Thus, even when the distance between the object and the mobile stereoscopic camera is fixed (e.g., constant), the focal distance may be changed by a difference between a child's face-width and an adult's face-width.

In addition, as shown in [Table 2], a critical parallax in infinity may be changed according to the focal distance. Thus, when the cellular phone 100 having the mobile stereoscopic camera is designed, the focal distance according to a size of the image sensor, a size (e.g., width) of the object, and a distance between the object and the mobile stereoscopic camera should be calculated (or, obtained). On this basis, a distance between both cameras of the mobile stereoscopic camera should be determined by allowing for the critical parallax according to the focal distance.

Figure 2:
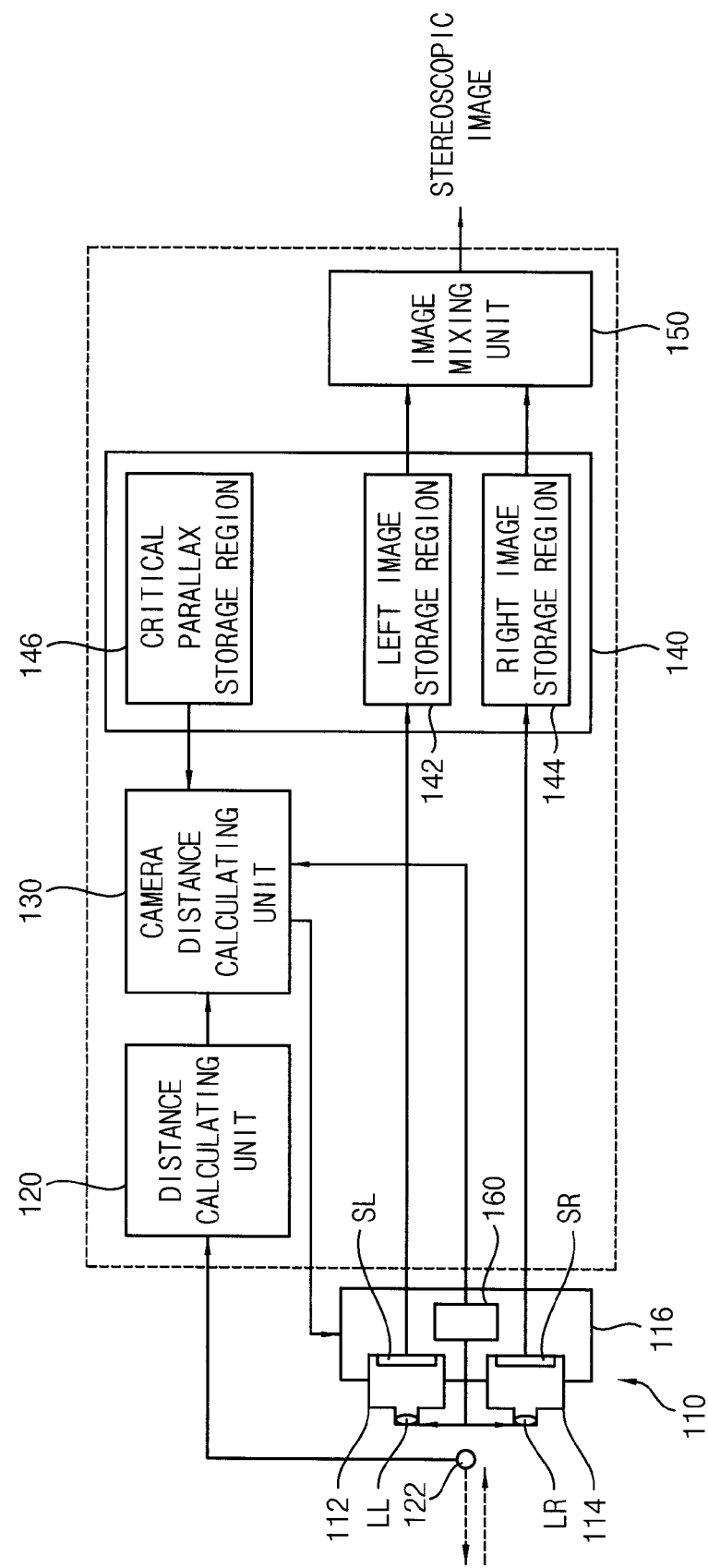
FIG. 2 is a block diagram illustrating an OSMU-type mobile stereoscopic camera according to example embodiments.

FIG. 2 is a block diagram illustrating an OSMU-type mobile stereoscopic camera according to example embodiments.

Referring to FIG. 2, the OSMU-type mobile stereoscopic camera may include a stereoscopic camera unit 110, a distance calculating unit 120, a camera distance calculating unit 130, an image storing unit 140, an image mixing unit 150, and an automatic focus adjusting unit 160.

The stereoscopic camera unit 110 may include both cameras (i.e., a left camera 112, a right camera 114) and a distance adjusting unit 116. Specifically, the left camera 112 and the right camera 114 are installed on the distance adjusting unit 116 in parallel. Here, the left camera 112 and the right camera 114 may move in a vertical direction to an optical axis (i.e., a direction from left (or, right) to right (or, left) with respect to the optical axis). Thus, the distance adjusting unit 116 may adjust a distance between the left camera 112 and the right camera 114. The left camera 112 includes a lens LL and an image sensor SL that are arranged on a common optical axis. The right camera 114 includes a lens LR and an image sensor SR that are arranged on a common optical axis. In example embodiments, respective diameters of the left lens LL and the right lens LR may be a diameter of a typical mobile lens. In addition, the left lens LL and the right lens LR may correspond to stereoscopic zooming lenses. Here, the image sensors SL and SR may be charge-coupled device (CCD) image sensors or complimentary metal oxide semiconductor (CMOS) image sensors. In this embodiment, an image sensor having a 1920*1080 16:9 HD resolution is used, where a size of the image sensor is ⅔" (e.g., 16:9 HD type, Diagonal length: 11 mm, Height: 5.39 mm, Width: 9.59 mm).

The distance adjusting unit 116 may symmetrically move the left camera 112 and the right camera 114 based on a horizontal movement mechanism that is driven by a servo motor or a linear motor. The distance adjusting unit 116 may operate with a distance adjustment range between 5 mm and 20 mm. Here, a minimum distance between the left camera 112 and the right camera 114 may be determined as a physical accessible distance between the left camera 112 and the right camera 114. In example embodiments, a distance between the left camera 112 and the right camera 114 is fixed to about 65 mm corresponding to a distance between both eyes of a human being. That is, a distance between the left camera 112 and the right camera 114 may be shorter than a distance between both eyes of the human being according to a mobile shooting environment. For example, a distance between the left camera 112 and the right camera 114 may be about ⅕ times as long as a distance between both eyes of the human being. This distance setting is for implementing identical or similar stereoscopic effects for various displays having different sizes. As a result, a user can enjoy (i.e., watch) a stereoscopic video mobile content without any eye-fatigue.

As described above, a distance between the left camera 112 and the right camera 114 may be adjusted. In some example embodiments, a distance between both CCD image sensors SL and SR may be adjusted. Similarly, a distance between both lenses LL and LR may be adjusted.

The distance calculating unit 120 may calculate a focusing distance ZO (or, a viewing distance) of the stereoscopic camera unit 110 (i.e., the left camera 112 and the right camera 114) based on distance information obtained by an optical distance measuring sensor 122. Here, a typical distance calculating algorithm is used for a distance calculating algorithm of the distance calculating unit 120 that uses the optical distance measuring sensor 122. In some example embodiments, the distance calculating unit 120 may not use the optical distance measuring sensor 122. For example, distance values (e.g., ZO, ZF) may be directly input by a user. In addition, a focusing distance ZO may be calculated based on a parallax of the stereoscopic image.

The camera distance calculating unit 130 may calculate a distance between the left camera 112 and the right camera 114 for one source multi use (OSMU) based on the calculated distance (i.e., the focusing distance ZO), a focal distance f, and a critical parallax D. In example embodiments, a distance between the left camera 112 and the right camera 114 for OSMU may be calculated using [Equation 1] below.

$$CO=D*ZO*\{(1/f)-(1/ZO)\} \quad \text{[Equation 1]}$$

Here, D denotes a critical parallax related to the image sensors SL and SR, and f denotes a focal distance related to the stereoscopic camera unit 110 (i.e., the left camera 112 and the right camera 114). The critical parallax D (e.g., referred to as Disparity) indicates an allowable maximum parallax between two images that are photographed by the image sensors SL and SR, respectively.

Figure 3:
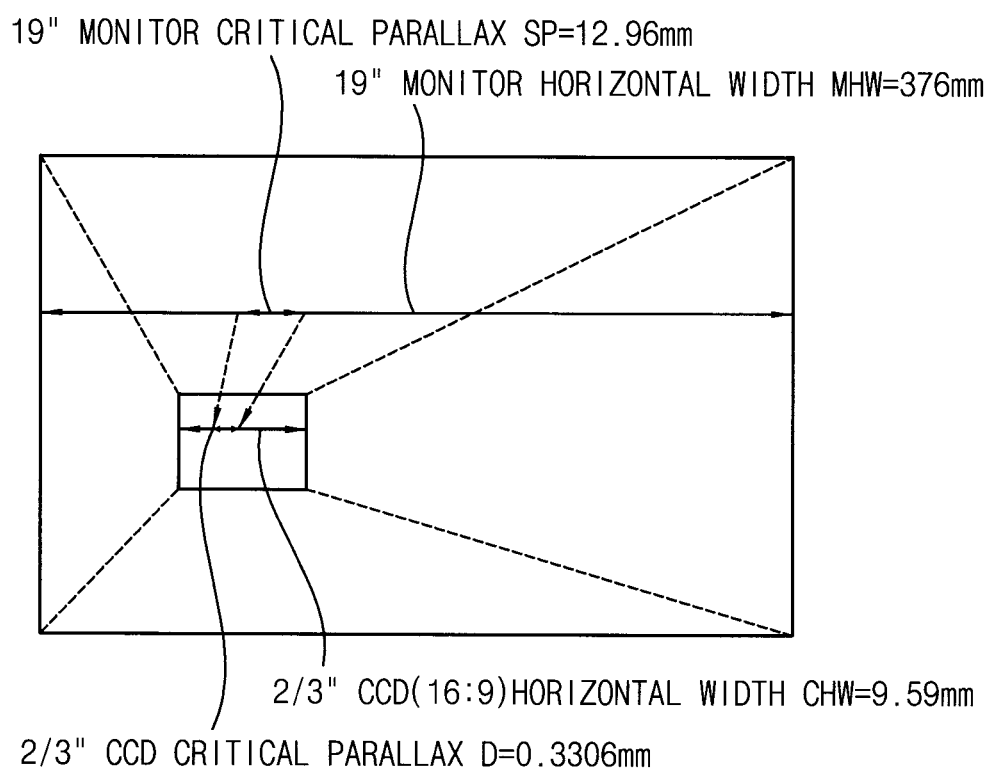
FIG. 3 is a diagram illustrating a monitor having a size of 19" and a charge coupled device (CCD) image sensor having a size of ⅔".

FIG. 3 is a diagram illustrating a monitor having a size of 19" and a charge coupled device (CCD) image sensor having a size of ⅔".

Referring to FIG. 3, a critical parallax is calculated based on an allowable maximum screen parallax SP for a reference display (e.g., the monitor having a size of 19"), a horizontal width MHW of the reference display, and a horizontal width CHW of the image sensor having a size of ⅔". In example embodiments, the critical parallax may be calculated using [Equation 2] below.

$$D=SP*(CHW/MHW) \quad \text{[Equation 2]}$$

A stereoscopic effect disappears when a difference between stereoscopic image angles in respective retinas of both eyes of a human being is out of a stereoscopic fusion range. Generally, the stereoscopic effect disappears when the difference between the stereoscopic image angles in respective retinas of both eyes of the human being is greater than 1.6 degrees. Thus, to implement the stereoscopic effect, a parallax of two stereoscopic images on a screen is required to be within a range that satisfies the stereoscopic fusion range. In example embodiments, a screen maximum parallax SP that satisfies the stereoscopic fusion range may be calculated using [Equation 3] below.

$$SP=(\text{viewing distance})*\tan(1.6) \quad \text{[Equation 3]}$$

The image storing unit 140 may receive a left image and a right image from the stereoscopic camera unit 110 of which a distance between the left camera 112 and the right camera 114 is adjusted using [Equation 1]. Then, the image storing unit 140 may store the left image and the right image in a left image storage region 142 and a right image storage region 144, respectively. The image storing unit 140 includes a critical parallax storage region 146. The critical parallax D stored in the critical parallax storage region 146 may be provided to the camera distance calculating unit 130.

The image mixing unit 150 shifts the left and right images stored in the left and right image storage regions 142 and 144 of the image storing unit 140 in left and right directions, respectively, so that zero parallaxes of the left and right images may converge by overlapping. Thereafter, the image mixing unit 150 mixes the overlapped image with the stereoscopic image having parallax. The mixed stereoscopic image is displayed on a stereoscopic display.

As described above, it is assumed that a camera horizontal-moving technique is employed. Alternatively, a camera-fixed technique may be employed. In this case, when the image mixing unit 150 receives the left and right images, the image mixing unit 150 may shift image data to provide the same effect as the camera horizontal-moving technique, and may read the shifted image data. These are described in a Korean Patent Application No. 10-2007-0100904 titled "OSMU-TYPE STEREOSCOPIC CAMERA AND METHOD OF MAKING STEREOSCOPIC VIDEO CONTENT THEREOF", the contents of which are incorporated herein by reference in its entirety.

The automatic focus adjusting unit 160 may perform a focusing control. That is, the automatic focus adjusting unit 160 may automatically adjust a focus of the stereoscopic camera unit 110 by controlling respective lenses LL and LR of the left and right cameras 112 and 114. Then, the automatic focus adjusting unit 160 may provide the camera distance calculating unit 130 with information related to the focused focal distance f.

Figure 4:
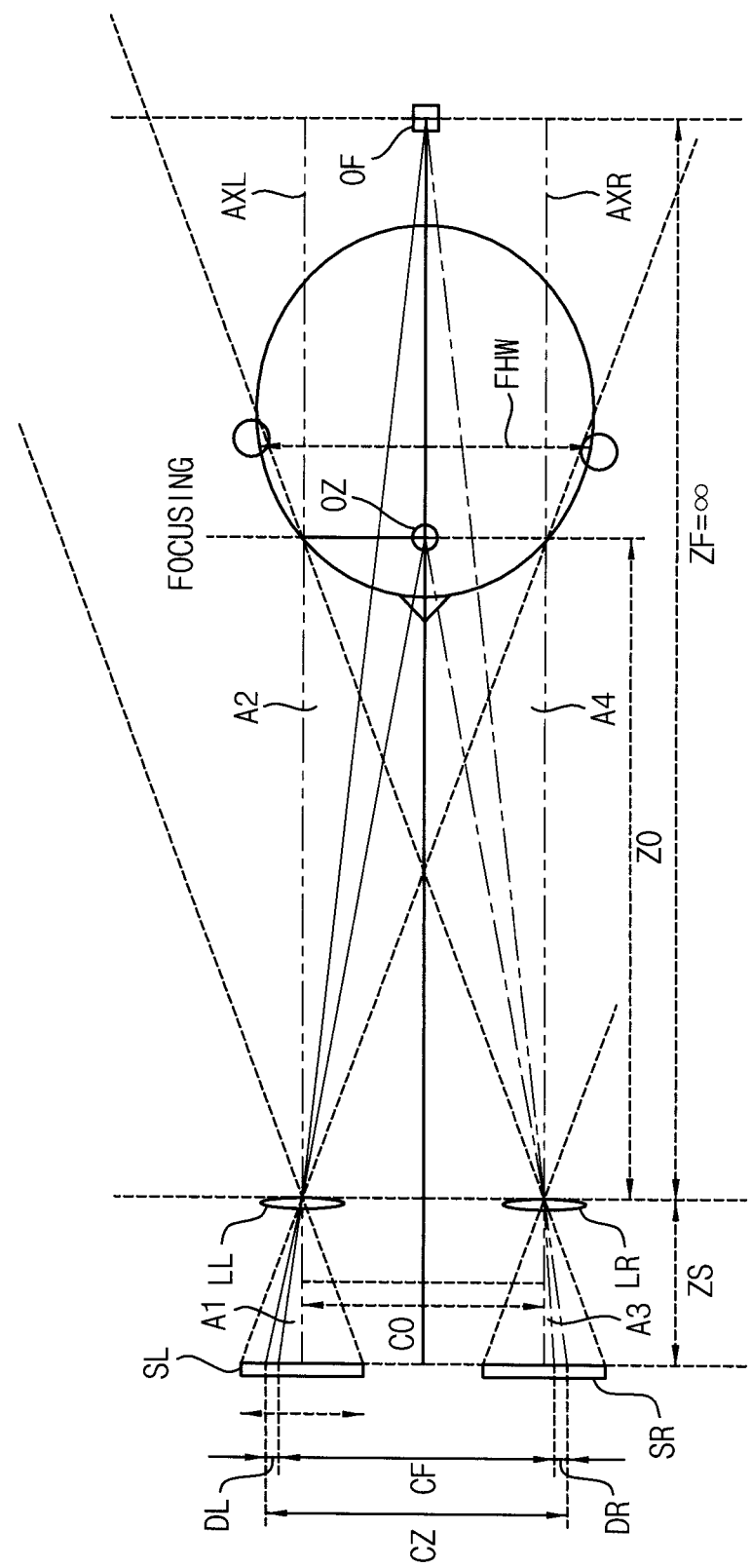
FIG. 4 is a diagram illustrating an optical geometrical relation between an object and left and right cameras in the OSMU-type mobile stereoscopic camera of FIG. 2.

FIG. 4 is a diagram illustrating an optical geometrical relation between an object and left and right cameras in the OSMU-type mobile stereoscopic camera of FIG. 2.

Referring to FIG. 4, an optical geometrical relation between an object and left and right cameras is illustrated with references listed below.

AXL: an optical axis of a left lens
AXR: an optical axis of a right lens
ZO: a distance in a straight line between a center of a lens and a focusing point (also, referred to as a convergence point) OZ
ZF: a distance in a straight line between a center of a lens and a far point OF of infinity
ZS: a distance in a straight line between a center of a lens and image sensors SL and SR
f: a focal length of a lens (i.e., a focal distance)
CO: a distance between centers of left and right lens LR and LR (i.e., a distance between left and right cameras 112 and 114)
CZ: a distance between centers of left and right image sensors SL and SR (i.e., a separation between centers of focused left and right images)
CF: a distance between centers of far point left and right images photographed by left and right image sensors SL and SR
CHW: a horizontal width of left and right image sensors SL and SR
DL: a left parallax
DR: a right parallax
SHW: a maximum horizontal face-width in a wide-angle shooting condition Thus, with reference to similar regions A1 and A2 of FIG. 4, an equation such as ZO:CO/2=ZS:(CZ−CO)/2) can be obtained. Accordingly, CZ may be calculated using [Equation 4] below.

$$CZ = (ZS/ZO)*CO + CO \quad \text{[Equation 4]}$$

Similarly, with reference to similar regions A3 and A4 of FIG. 4, an equation such as ZF:CO/2=ZS:(CF−CO)/2) can be obtained. Accordingly, CF may be calculated using [Equation 5] below.

$$CF = (ZS/ZF)*CO + CO \quad \text{[Equation 5]}$$

At the far point, a parallax (e.g., referred to as Disparity) between the left and right images that are photographed by the left and right image sensors SL and SR may be calculated using [Equation 6].

$$\begin{aligned} D &= DL + DR \\ &= CZ - CF \\ &= (ZS/ZO)*CO + CO - CO \\ &= ZS*CO/ZO \end{aligned} \quad \text{[Equation 6]}$$

Here, ZS/ZF is approximated to zero (i.e., ZS/ZF ≈ 0). Then, [Equation 1] may be obtained when substituting [Equation 7] below for 1/ZS of [Equation 6].

$$1/ZS = 1/f - 1/ZO \quad \text{[Equation 7]}$$

Therefore, the present inventive concept may readjust a distance between the left camera 112 and the right camera 114 based on [Equation 1] by measuring a focusing distance when a location of the OSMU-type mobile stereoscopic camera is determined. In addition, when a shooting is performed by the OSMU-type mobile stereoscopic camera in which a distance between the left camera 112 and the right camera 114 is readjusted, a parallax between the left and right images that are photographed at a maximum far point may not be out of a range of the critical parallax D. As a result, an OSMU stereoscopic image capable of providing a maximum stereoscopic effect within the stereoscopic fusion range may be obtained (i.e., photographed).

Here, the focusing distance ZO may be calculated based on a focal distance fw in a wide-angle shooting condition for a horizontal width CHW of a CCD image sensor related to a shoot-able maximum face-width FHW. For example, the focusing distance ZO may be calculated using [Equation 8] below.

$$ZO = (FHW/CHW)*fw \quad \text{[Equation 8]}$$

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of shooting a one source multi use (OSMU) stereoscopic image using a mobile stereoscopic camera including an image sensor, the method comprising:
    placing the mobile stereoscopic camera on a predetermined location of a mobile shooting place;
    determining a focusing distance based on a focal distance in a wide-angle shooting condition for a horizontal width of the image sensor related to a shoot-able maximum face-width;
    calculating a distance between two cameras of the mobile stereoscopic camera based on the determined focusing distance;
    adjusting the distance between the cameras of the mobile stereoscopic camera to be the calculated distance between the cameras of the mobile stereoscopic camera; and
    shooting the OSMU stereoscopic image using the mobile stereoscopic camera of which the distance between the cameras is adjusted,
    wherein the focusing distance is determined using [Equation] below, $$ZO = (FHW/CHW)*fw \quad \text{[Equation]}$$

where ZO denotes the focusing distance, FHW denotes the shoot-able maximum face-width, CHW denotes the horizontal width of an image sensor, and fw denotes the focal distance.

2. The method of claim 1, wherein a zooming operation is performed on focal distances that are greater than the focal distance of the mobile stereoscopic camera in the wide-angle shooting condition, and wherein the distance between the cameras of the mobile stereoscopic camera is readjusted based on respective zoomed focal distances.

3. A mobile stereoscopic camera comprising:

left and right cameras aligned with parallel optical axes;

a distance calculating unit configured to calculate a focusing distance of the left and right cameras;

a camera distance calculating unit configured to calculate a distance between the left and right cameras based on information related to the calculated focusing distance, a critical parallax, and a focused focal distance;

a camera distance adjusting module configured to adjust the distance between the left and right cameras in response to the calculated distance between the left and right cameras; and an image storing unit configured to store left and right images photographed by the left and right cameras, the distance of the left and right cameras being readjusted by the camera distance calculating unit, wherein the distance calculating unit is configured to calculate the focusing distance using [Equation] below, $$ZO=(FHW/CHW)*fw \qquad \text{[Equation]}$$

where ZO denotes the focusing distance, FHW denotes a shoot-able maximum face-width, CHW denotes a horizontal width of an image sensor, and fw denotes a focal distance in the wide-angle shooting condition for the horizontal width of the image sensor related to the shoot-able maximum face-width.

\* \* \* \* \*